March 2, 1965 G. W. MICHALEC 3,171,212
GEAR MECHANISM
Filed July 11, 1962 3 Sheets-Sheet 1

*INVENTOR.*
GEORGE W. MICHALEC
BY
ATTORNEY

March 2, 1965 G. W. MICHALEC 3,171,212
GEAR MECHANISM
Filed July 11, 1962 3 Sheets-Sheet 2

INVENTOR.
GEORGE W. MICHALEC
BY
ATTORNEY

March 2, 1965     G. W. MICHALEC     3,171,212
GEAR MECHANISM

Filed July 11, 1962     3 Sheets-Sheet 3

*INVENTOR.*
GEORGE W. MICHALEC

BY

ATTORNEY

United States Patent Office 3,171,212
Patented Mar. 2, 1965

3,171,212
GEAR MECHANISM
George W. Michalec, Pleasantville, N.Y., assignor to
General Precision, Inc., a corporation of Delaware
Filed July 11, 1962, Ser. No. 209,145
16 Claims. (Cl. 33—179.5)

This invention relates to a gear mechanism useful for taking up backlash between mating gears and also useful for measuring the tooth thickness of gears.

The undesirable effects of backlash, particularly in the instrumentation, automatic control and computation fields, have led to considerable effort toward its elimination and control. To make perfect gears is impossible, and the cost of high precision gears may often be prohibitive. Therefore, many special design, fabrication, and assembly techniques have been developed to allow the use of imperfect gears without the consequence of excessive backlash.

One technique for eliminating backlash involves the adjustment of the distance between the centers of the gears by providing one shaft with an eccentric bearing bushing or with an oversized bearing bushing hole. Such an arrangement obviously creates problems regarding shaft parallelism and in addition increases the cost of assembly since it requires a skilled mechanic to make the precise adjustments which are in increments on the order of 0.001" or less.

Another technique uses two identical gears mounted side by side axially but rotationally free relative to each other. Spring loading forces the two gears apart sufficiently to completely fill the tooth space of a full-faced mating gear. This technique has the disadvantage that the spring loading must be at least equal to the maximum load to be transmitted with the result that the gears and bearings are always loaded to the maximum.

A variation of the above technique omits the spring loading and substitutes frictional locking screws or clamps or, in some cases, dowels or rivets. Assembly cost is high since great skill is necessary to adjust and lock the gears properly.

Another arrangement uses a small torque motor geared to the output shaft which keeps the gear meshes constantly loaded in one direction. This technique is limited to applications where there is considerable gear reduction in the train so that the torque motor will not drive the train backward and additionally so that the additional load of the torque motor will be insignificant for a prime mover located at the high speed end of the gear train. A variation is the use of a hair spring in place of the torque motor in those cases where there is but a limited output rotation.

Another technique uses two mating tapered or conical gears in which the tooth thickness varies across the length of the pitch cylinder. Backlash is adjusted by relative axial movement of the gears. A major disadvantage is the high cost of these nonstandard gears.

It is a general object of the present invention to provide an improved mechanism for minimizing backlash.

Another object is to provide an antibacklash mechanism which is inexpensive.

Another object is to provide an antibacklash mechanism which is easy to adjust for optimum performance.

Another object is to provide an antibacklash mechanism which does not unduly load the gears and bearings Gear size has been measured in the past by a number of methods, two of the most common being the over pins measurement and the variable center distance measurement. In the former, two rolls, or pins (or wires as they are sometimes called) are placed at diametrically opposite points between two adjacent teeth and the overall distance between the outer surfaces of the pins is measured. Tooth thickness is then calculated by well known methods. In the variable center distance method, the gear to be measured is meshed tightly, under predetermined pressure, with an accurate master and rotated. The actual center distance is measured by means of a referenced indicator.

Each of the above methods is both widely used and very useful. However, each requires the use of expensive fixtures and indicators. Each usually requires conversion of the observed data to another, more useful form.

Another object of the present invention is to provide an inexpensive gear measurer.

Another object is to provide a gear measurer which is quick and easy to use.

Another object is to provide a gear measurer which yields a direct reading in tooth size.

Another object is to provide a gear measurer which is readily adaptable to yield an indication that the gear being measured is either within or without an acceptable range of sizes.

An unusual feature of the present invention is that the same apparatus may be used for two different purposes, namely, as an antibacklash mechanism in an operating gear train and as a device for measuring gear size. Briefly stated, the invention comprises two gears having an unequal number of teeth mounted on a common axis but freely rotatable with respect to each other. Both gears mesh with a common driving pinion. Additionally, both gears mesh with a common idler pinion which is mounted on an arm which in turn is rotatable about the common gear axis.

For use as an antibacklash mechanism, the arm is rotated thereby driving the teeth of the two gears apart until the backlash is taken up at which point the arm is fastened in place.

For use as a measuring instrument, a reference pinion of known size (tooth thickness) is selected and mounted as the driving pinion. The arm is rotated until the backlash is taken up and the angular position of the arm is noted. The arm is released and the pinion to be measured is substituted for the reference pinion. The arm is again rotated until backlash is taken up and its new position noted. The difference between the two positions is a measure of the difference in tooth thickness of the two pinions.

For a clearer understanding of the invention reference may be made to the following detailed description and the accompanying drawing, in which.

Figure 3:
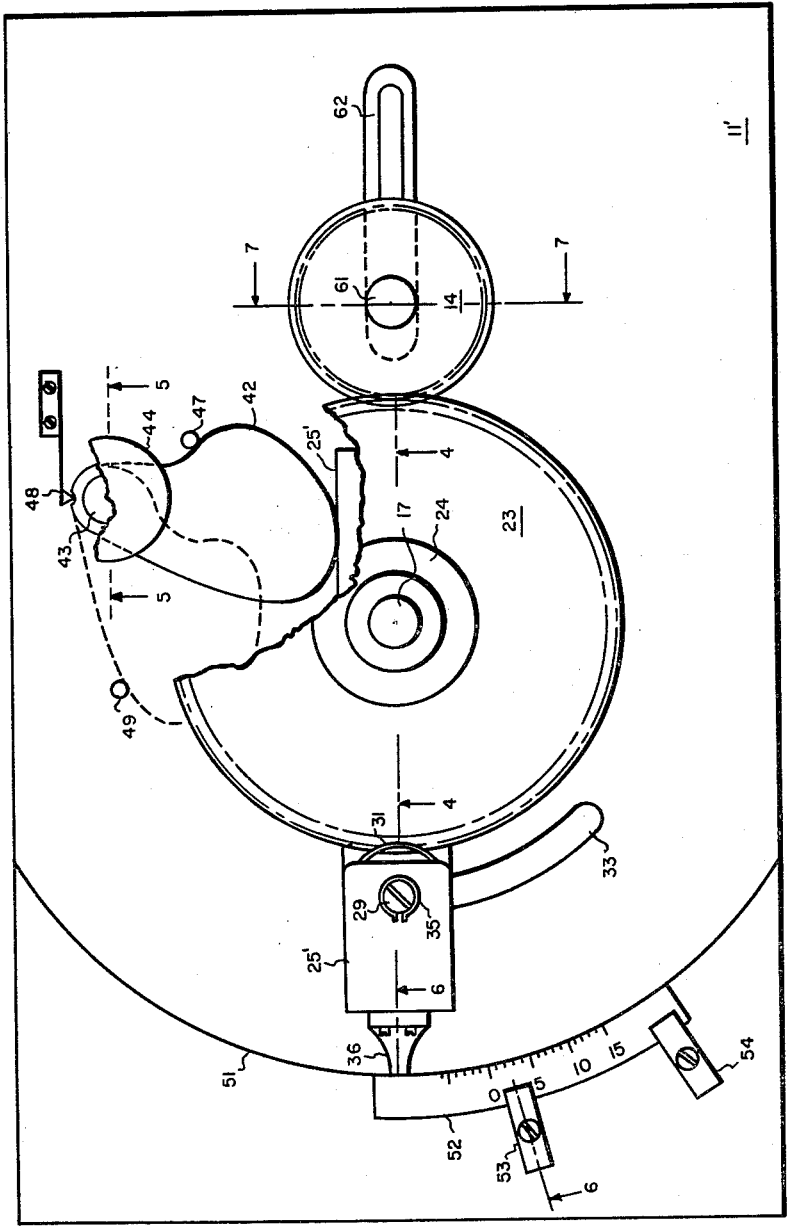
FIGURE 3 is a plan view of a modified form of the invention.

FIGURES 4, 5, 6 and 7 are fragmentary cross-section views of details, taken as indicated by the lines 4—4, 5—5, 6—6 and 7—7 respectively of FIG. 3.

Figure 1:
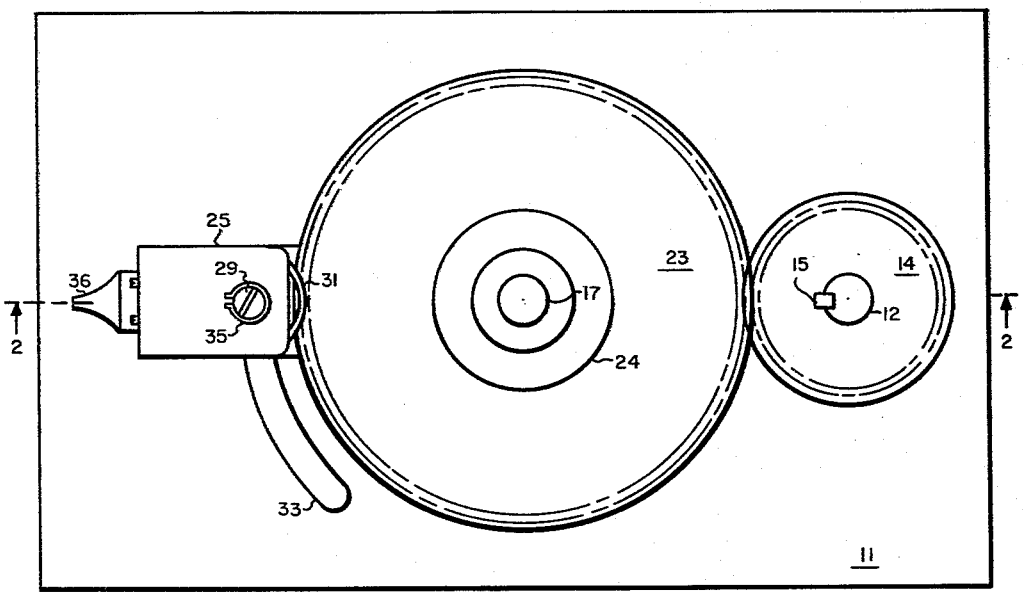
FIGURE 1 is a plan view of one embodiment of the invention.
Figure 2:
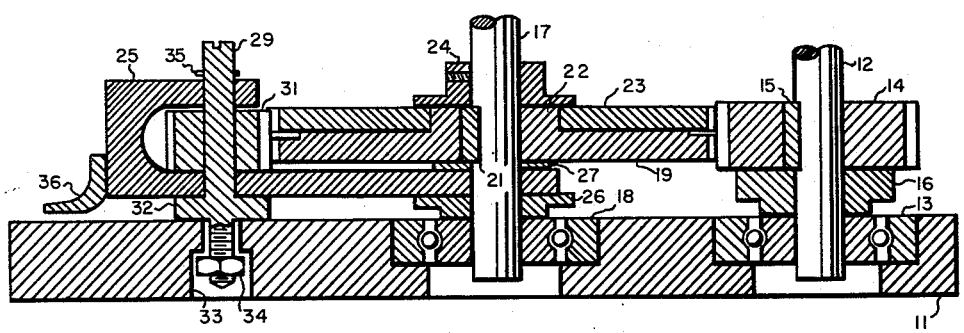
FIGURE 2 is a cross-section view taken on the plane 2—2 of FIG. 1.

Referring now FIGS. 1 and 2, there is shown a base 11 for supporting the apparatus. An input shaft 12 is freely rotatable in a bearing 13 fastened to the base 11 and has a driving pinion 14 fastened thereto by means of a key 15. A washer 16 spaces the pinion 14 from the bearing 13.

An output shaft 17 is journaled in a bearing 18 mounted on the base 11 and has a gear 19 fastened thereto by means of a key 21. The gear 19 is formed with a hub 22 and a gear 23 is mounted to be freely rotatable thereabout. A collar 24 fastened to the shaft 17 holds the gears 19 and 23 in place. The driving pinion 14 meshes with both of the gears 19 and 23.

An arm 25 is freely rotatable about the shaft 17 and is spaced from the bearing 18 by a washer 26 and from the gear 19 by a spacer 27. The end of the arm remote from the shaft 17 is U-shaped and is provided with a stud 29 which passes through and is freely rotatable in both legs of the U. An adjusting pinion 31 is mounted on the stud 29 in the region between the legs of the U so as to mesh with both of the gears 19 and 23 and is freely rotatable about the stud 29. The stud 29 is formed with an enlarged diameter portion 32 which spaces the arm 25 from the base 11. The lower portion of the stud 29 comprises a short threaded rod which passes part way through an arcuate slot 33 formed in the base 11. The slot 33 terminates at one end approximately on the extended line joining the centers of the shafts 12 and 17 so as to limit the rotation of the arm 25 in the clockwise direction to the position shown in FIG. 1 with the axes of the pinion 14, the gears 19 and 23, and the pinion 31 aligned. The slot 33 preferably extends in the other direction at least forty five degrees. As shown, the slot 33 is enlarged at the bottom portion sufficiently to receive a hexagonal nut 34 which is threaded on the rod portion of the stud 29. The stud 29 is held in place at its upper end by a retaining ring 35 and the top of the stud is slotted to accommodate a screw driver. The size of the nut 34 and the size of the enlarged portion of the slot 33 are preferably selected so that the nut 34 may slide freely in the slot while being held against rotation so that the arm 25 may be clamped to the base 11 by turning the stud 29 with a screw driver. A pointer 36 fastened to the end of the arm 25 assists in noting the angular position of the arm.

The gears 19 and 23 and the pinions 14 and 31 must, of course, all have the same pitch in order to mesh properly with each other. The gears 19 and 23, although each meshing simultaneously with both of the pinions 14 and 31, have different numbers of teeth. With the same diametral pitch and different numbers of teeth the pitch diameters are, of course, different. This would normally result in gears having different root and outside diameters. However, it is preferred, although not absolutely essential, that the gears 19 and 23 be made to have the same outside and root diameters, as by altering slightly the normal addendum and/or dedendum of one or both gears. Such gears are commonly referred to as "modified gears" or "profile shifted gears."

The numbers of teeth in the gears 19 and 23 differ by two or more so that there are two or more positions around the circumference of these gears at which the teeth are in alignment and at which pinions can mesh freely with both gears. It is preferred at present that the numbers of teeth differ by two so that there are two diametrically opposite points at which pinions can mesh freely. The drawing shows the pinions 14 and 31 positioned at these points. If the arm 25 be rotated about its pivot (the shaft 17) the gears 19 and 23 will rotate relative to each other causing a displacement of the positions at which the teeth are aligned thereby tightening the mesh of both pinions.

In operation as an antibacklash device, the parts are positioned as shown in the drawing. There will, in general, be some backlash between the driving pinion 14 and the driven gear 19. The arm 25 is displaced slowly until the backlash is taken up. The pinion 14 should now be rotated slowly to be sure that there is no binding at the point of tightest mesh. The arm 25 may then be clamped to the base 11 by tightening the stud 29 with a screw driver.

In operation as a gear tester or measurer, the apparatus is first set to the position shown in FIGS. 1 and 2. A pinion the size (tooth thickness) of which is known is selected as a reference pinion and mounted on the shaft 12. (During this operation it may be convenient to dispense with the key 15 because it is immaterial at this time whether the pinion rotates with or is rotatable about the shaft 12.) The arm 25 is rotated as before until the backlash is taken up and the angular position of the arm is noted with the aid of the pointer 36, as by marking the base 11. The apparatus is returned to the neutral position shown and the reference pinion is replaced by the pinion to be measured. The arm 25 is again rotated until the backlash is taken up and its position noted. The circumferential distance along the arc between the two noted positions is an amplified measure of the difference between the tooth thicknesses of the reference pinion and the pinion being measured. As will be more fully explained, this distance is directly proportional to the difference in tooth thickness, so that, with the proportionality constant known for the particular apparatus, the deviation of the gear under test from the reference gear can be readily determined.

It is obvious that the amount by which the teeth of the gears 19 and 23 must be spread apart, or shifted in phase, to take up the backlash depends upon the tooth thickness of the pinion 14. The difference in the spreading required for a pinion under test as compared to that required for a reference pinion is obviously a measure of the difference in tooth thickness of the two pinions, assuming, of course, that both pinions have the same pitch.

Consider now the relationship between tooth thickness difference and pointer movement. Let $P_d$ = diametral pitch
$P_c$ = circular pitch
$R$ = radius of pointer as is well known, $$p_c = \frac{\pi}{p_d}$$

Consider the case where the numbers of teeth of the gears 19 and 23 differ by two. If the arm 25 (and the pinion 31) were rotated one full turn around the gears 19 and 23, the relative angular position of the gears would be changed by two teeth. In other words, the phase shift for one full turn (360°) is two teeth, or $2P_c$ inches, or $$\frac{2\pi}{P_d}$$

inches. But 360° rotation corresponds $2\pi R$ inches of travel of the pointer 36. Accordingly, $2\pi R$ inches of pointer travel corresponds to $$\frac{2\pi}{P_d}$$

inches of phase shift. Stated another way, one inch of phase shift corresponds to $RP_d$ inches of pointer travel.

In one illustrative example the diametral pitch of the gears and pinions was 20 and the radius of the pointer was 3.5", making $RP_d = 70$. Thus, each 0.001" of tooth thickness difference was measured by 0.070" of pointer travel.

To further specify the illustrative example, the gears 19 and 23 had pitch diameters of 3.500" and 3.400" respectively, each had an outside diameter of 3.600", the gear 19 had 70 teeth, the gear 23 had 68 teeth, the pinion 14 had 30 teeth and the idler pinion 31 had 15 teeth.

The embodiment of FIGS. 1 and 2 can be used to measure tooth thickness, as explained above. However, a few modifications of the basic apparatus simplifies the procedure.

Figure 4:
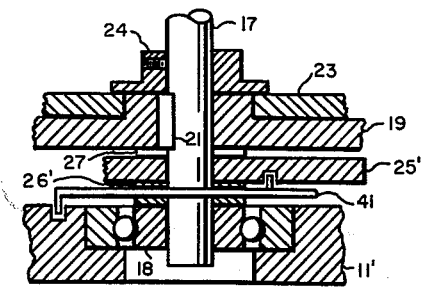

Referring now to FIG. 3, there is shown a modified base 11' which supports the apparatus. The gears 19 and 23 are mounted on the shaft 17, substantially as before. The arm 25' is the same as the arm 25 except that it has been extended in length to the right, as viewed in FIG. 3. As shown in FIG. 4, the washer 26' is of uniform diameter (instead of having a T-shaped cross-section) and is encircled by a flat spiral spring 41 one end of which is held in a small recess in the base 11' and the other end of which is similarly held by the arm 25'. The purpose of the spring 41 is to urge the arm 25' counterclockwise, as viewed in FIG. 3, thereby tightening the mesh between the pinion 14 and the gears 19 and 23. The strength of the spring must, of course, be selected with due regard for the material of which the gears are made and for the width of the teeth. The use of the spring 41 increases the accuracy of measurement obtainable because the mesh of the reference pinion and that of the pinion under test are consistently tightened equally.

Figure 5:
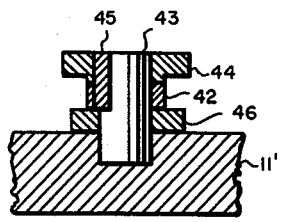

A cam 42 is mounted on a shaft 43 which is also provided with a knob 44 for rotating the cam. As shown in FIG. 5, the cam 42 and the knob 44 are fastened by means of a key 45 to the shaft 43 which is freely rotatable in a recess in the base 11'. A bushing or washer 46 spaces the cam 42 from the base 11' by the proper amount so that the cam 42 engages the arm 25' as shown in FIG. 3 and resists the urging of the spring 41 (FIG. 4).

A pin 47 fastened in the base 11' limits the counterclockwise rotation of the cam 42 to the position shown by the full outline in FIG. 3. This position is further established by a spring biased detent 48 which cooperates with a depression or groove in the cam 42 as shown. Manual rotation of the knob 44 releases the detent and allows the cam 42 to be rotated clockwise to the position shown by the dotted outline to which position it is limited by a pin 49 fastened to the base 11'. When so rotated, the spring 41 (FIG. 4) rotates the arm 25' counterclockwise.

Figure 6:
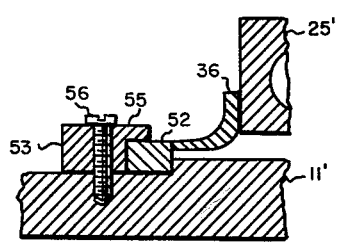

The left portion of the base 11' (as viewed in FIG. 3) is of reduced thickness. The junction of the portion of reduced thickness with the portion of normal thickness defines a step or shoulder 51 in the shape of an arc the center of which is the axis of the shaft 17. An arcuate scale 52 abuts the shoulder 51 and is held in place by two clamps 53 and 54. As best shown in FIG. 6, the clamp 53 is formed with a lip 55 which overlies the scale 52. A bolt 56, threaded to the base 11', holds the clamp 53 in place. The clamp 54 is similar.

Figure 7:
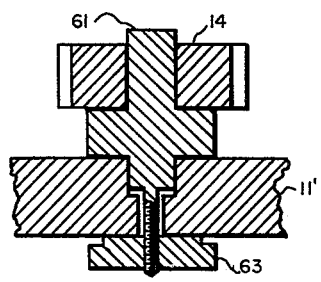

The pinion 14 is freely rotatable about a stud 61 which is slideable in a slot 62 formed in the base 11'. As best shown in FIG. 7, the stud 61 comprises a small cylindrical upper shaft-like portion about which the pinion 14 is rotatable, an enlarged cylindrical portion which serves to space the pinion 41 from the base 11, a lower stub shaft portion which is slideable in the slot 62, and a downwardly extending threaded rod portion. The latter portion extends through the lower portion of the slot 62 which is of reduced width. A knob 63 threaded to the downwardly extending rod portion of the stud 61 permits the stud 61 to be clamped in any position in the slot 62.

In operation, a reference pinion the size of which is known, is placed on the stud 61. The knob 63 (FIG. 7) is loosened and the pinion is brought into mesh with the gears 19 and 23. Next the knob 44 is turned clockwise, allowing the spring 41 (FIG. 4) to rotate the arm 25' counterclockwise, thereby gradually tightening the mesh between the reference pinion and the gears 19 and 23. The clamps 53 and 54 are loosened and the scale 52 is adjusted to align the zero mark with the index mark on the pointer 36, whereupon the clamps are tightened. The knob 44 is now rotated counterclockwise to the position shown in FIG. 3, thereby bringing the arm 25' to its reference position and loosening the mesh of the reference pinion with the gears 19 and 23. Now a pinion to be measured is placed on the stud 61 in place of the reference pinion, the knob 44 is used to rotate the cam 42, again allowing the spring 41 (FIG. 4) to rotate the arm 25' counterclockwise. The deviation of the index mark on the pointer 36 from the zero mark on the scale 52 is a direct measure of the difference between the tooth thicknesses of the reference pinion and the pinion being measured.

The scale 52 may be made to read difference in tooth thickness directly in thousandths of an inch or less. Considering the previous example wherein the diametral pitch of all of the gears was 20 and the radius of the pointer was 3.5", scale divisions may be placed 0.070" apart whereupon each scale division represents 0.001" difference in tooth thickness. Obviously an increase in the radial distance of the pointer 36 and the scale 52 from the shaft 17 would increase the scale factor proportionately.

The apparatus may be used to determine at a glance whether a pinion under test falls within a predetermined tolerance. With the reference pinion in place, the scale 52 is marked on one or both sides of zero with lines indicative of the permissive range of values. A group of pinions may now be measured successively and each may be immediately accepted or rejected as indicated by the position of the pointer 36.

It is also possible to arrange the apparatus to indicate actual tooth thickness directly. To do this it is only necessary to provide the scale 52 with appropriate numerals covering the range of tooth thicknesses expected to be encountered, the scale divisions remaining the same as before. With the reference pinion in place, the scale 52 is then adjusted until it reads the known tooth thickness of the reference pinion. Thereafter, the tooth thickness of any pinion under test may be read off directly.

The slot 62 is provided to enable pinions of various sizes (numbers of teeth) to be measured. For each size it is necessary, of course, to have available one reference pinion the tooth thickness of which is known. As previously discussed, the reference pinion is placed on the stud 61, brought into mesh with the gears 19 and 23, and clamped into place with the knob 63 (FIG. 7). After the scale 52 is adjusted, any number of pinions having the same number of teeth as the reference pinion may be measured.

The center-to-center distance between the shaft 17 and the stud 61 is not critical. It is only necessary that the reference pinion be brought up to what appears to be a good mesh with the gears 19 and 23, clamped in place with the knob 63, and the scale 52 adjusted. An unknown pinion may now be measured. If the knob 63 be loosened and the entire procedure be repeated, it is unlikely that the center-to-center distance will be exactly the same the second time. However, any difference in such center-to-center distances is substantially entirely compensated for by the second adjustment of the scale 52.

If gears of a different pitch are to be measured, it is necessary to replace all of the gears and pinions with gears of the new pitch. Additionally, the scale 52 must be replaced because the calibration factor, as previously explained, is $RP_d$.

Although specific embodiments have been described for illustrative purposes, many modifications can be made within the spirit of the invention. It is therefore desired that the protection afforded by Letters Patent be limited only by the true scope of the appended claims.

What is claimed is:
1. A gear mechanism, comprising,
first and second spur gears having substantially the same outside diameter and having numbers of teeth differing by at least two,
said gears being mounted to be independently rotatable about a common axis,
gear means traversable along an arc formed by the circumference of said first and second spur gears and meshing with said first and second spur gears for adjustably displacing said first and second gears circumferentially with respect to each other, and
a third gear, circumferentially displaced from said gear means, meshing simultaneously with both said first and second spur gears.
2. A gear mechanism, comprising,
first and second spur gears having the same diameter but different numbers of teeth by at least two, mounted to be independently rotatable with respect to each other about a common axis,
a first pinion gear meshing with both of said gears, and
a second pinion gear meshing with both of said gears at a point circumferentially displaced from said first pinion gear,
said second pinion being mounted on an axis, said axis being movable in an arc about said common axis of said first and second gears.

3. A gear mechanism, comprising,
first and second spur gears mounted to be independently rotatable with respect to each other about a common axis,
said gears having the same diameter but the numbers of teeth of which differ by at least two, whereby there are at least two circumferential positions at which a pinion gear can mesh freely with both of said gears,
a first pinion gear meshing with both of said gears at one of said at least two circumferential positions, and
a second pinion gear meshing with both of said gears, said second pinion being mounted on an axis which is movable along an arc the center of which is said common axis, said second pinion gear meshing with both said gears at another of said at least two circumferential positions.

4. A gear mechanism, comprising,
first and second spur gears mounted to be independently rotatable with respect to each other about a common axis,
said gears having the same diameter but having numbers of teeth which differ by two, whereby there are two circumferential positions at which a pinion gear can mesh freely with both of said gears,
a first pinion gear meshing with both of said gears and mounted on an axis which intersects a first radius of said gears,
a second pinion gear meshing with both of said gears and mounted on an axis which intersects a second radius of said gears,
and means for adjusting the angle between said first and second radii.

5. A gear mechanism, comprising,
a first shaft,
first and second spur gears carried by said first shaft and independently rotatable with respect to each other,
said gears having the same diameter but having numbers of teeth differing by at least two,
a first pinion gear meshing with both of said gears,
a second shaft carrying said first pinion,
a second pinion gear meshing with both of said gears,
a third shaft carrying said second pinion,
said third shaft being mounted at a fixed distance from said first shaft but angularly adjustable with respect to a line joining said first and second shafts.

6. A gear mechanism, comprising,
first and second spur gears having the same diameter but different numbers of teeth by at least two mounted on a common axis and independently rotatable with respect to each other,
a first pinion gear meshing with both of said gears,
an arm pivoted about said common axis, and
a second pinion gear mounted on said arm and meshing with both of said gears at a point circumferentially displaced from the point at which said first pinion gear meshes with said gears.

7. A gear mechanism, comprising,
first and second spur gears having the same diameter but different numbers of teeth by at least two, mounted on a common axis and independently rotatable with respect to each other,
a first pinion gear meshing with both of said gears,
an arm pivoted about said common axis,
means for limiting the rotational movement of said arm, and
a second pinion gear mounted on said arm and meshing with both of said gears at a point circumferentially displaced from the point at which said first pinion gear so meshes.

8. A gear mechanism, comprising,
first and second spur gears having the same diameter but numbers of teeth differing by at least two,
said gears being mounted on a common axis and independently rotatable with respect to each other,
a first pinion gear meshing with both of said gears,
an arm pivoted about said common axis,
a second pinion gear mounted on said arm and meshing with both of said gears, and
means for establishing a limiting position of rotation of said arms, said position being with the axes of said first pinion, said first and second gears and said second pinion in alignment.

9. A gear mechanism, comprising,
an input shaft,
an output shaft,
a first spur gear fastened to and rotatable with said output shaft,
a second spur gear mounted on and freely rotatable about said output shaft,
said first and second gears having equal diameters but numbers of teeth differing by at least two,
a first pinion gear fastened to said input shaft and meshing with both said first and said second gears,
an arm pivoted about said output shaft, and
a second pinion gear rotatably mounted on said arm and meshing with both said first and said second gears at a point circumferentially displaced from the point at which said first pinion gear so meshes.

10. A gear mechanism, comprising,
a frame,
a first shaft rotatably supported by said frame,
a first gear fastened to and rotatable with said first shaft,
a second gear freely rotatable about said first shaft,
said first and second gears having equal pitches and outside diameters but numbers of teeth differing by two,
a second shaft rotatably supported by said frame,
a first pinion fastened to said second shaft and meshing with both said first and said second gears,
an arm pivoted about said first shaft,
a second pinion rotatably mounted on said arm and meshing with both said first and said second gears,
and means for fastening said arm to and releasing said arm from said frame.

11. A gear mechanism, comprising,
first and second spur gears having the same diameter but numbers of teeth differing by at least two,
said gears being mounted to be independently rotatable with respect to each other about a common axis,
a first pinion gear meshing with both of said gears at a first circumferential point on both said gears,
an arm pivoted about said common axis,
a second pinion gear mounted on said arm and meshing with both of said gears at another circumferential point on both said gears, and
a scale for indicating the angular position of said arm.

12. A gear mechanism, comprising,
first and second spur gears having the same diameter but numbers of teeth differing by at least two,
said gears being mounted to be independently rotatable with respect to each other about a common axis,
a first pinion gear meshing with both of said gears,
an arm pivoted about said common axis,
a second pinion gear mounted on said arm and meshing with both of said gears at a point circumferentially displaced from said first pinion gear, and
spring means for urging said arm rotationally about said common axis.

13. A gear mechanism, comprising,
first and second spur gears having the same diameter but numbers of teeth differing by at least two,
said gears being mounted to be independently rotatable with respect to each other about a common axis,
a first pinion gear meshing with both of said gears,
an arm pivoted about said common axis,
a second pinion gear mounted on said arm and meshing with both of said gears,
means for establishing a reference angular position of said arm at which the axes of all of said gears and pinions are aligned,
spring means for urging said arm rotationally away from said reference position, and
manually operable cam means for selectively either overcoming the urging of said spring means and rotating said arm to said reference position or allowing said spring means to rotate said arm away from said reference position.

14. A gear mechanism, comprising,
first and second spur gears having the same diameter but numbers of teeth differing by at least two,
said gears being mounted on a common first axis and independently rotatable with respect to each other,
a first pinion gear rotatable about a second axis parallel to said first axis,
means for adjusting the distance between said first and second axes,
whereby there is such a distance at which said first pinion meshes with both said first and second gears,
an arm pivoted about said first axis, and
a second pinion gear mounted on said arm and meshing with both said first and said second gears at a point circumferentially displaced from the point at which said first pinion meshes with said first and second spur gears.

15. A gear mechanism, comprising,
a base,
a first shaft supported by said base substantially perpendicular thereto,
first and second spur gears mounted on said shaft and independently rotatable with respect to each other,
said gears having the same diameter but numbers of teeth differing by at least two,
said base being formed with a longitudinal slot lying on an extended radius of said gears,
a second shaft,
a first pinion gear supported by said second shaft,
said second shaft being supported by said base substantially perpendicular thereto and slideable along the length of said slot,
whereby there is a position of said second shaft in said slot at which said first pinion meshes with both said first and second gears, and
a second pinion gear meshing with both said first and second gears at a point circumferentially displaced from the point at which said first pinion gear so meshes with said first and second gears, said second pinion being rotatable about an axis which is movable along an arc the center of which arc is the axis of said first shaft.

16. A gear mechanism, comprising,
a base,
a first shaft supported by said base substantially perpendicular thereto,
first and second gears mounted on said shaft and freely rotatable with respect to each other,
said gears having the same pitch and the same outside diameter but having numbers of teeth differing by two,
said base being formed with a longitudinal slot lying on an extended radius of said gears,
a second shaft,
a first pinion supported by said second shaft,
said second shaft being supported by said base substantially perpendicular thereto and slideable along the length of said slot,
whereby there is a position of said second shaft along said slot at which said first pinion meshes with both said first and second gears,
an arm pivoted about said first shaft,
a pointer on the end of said arm,
a scale releasably fastened to said base and cooperating with said pointer for indicating the angular position of said arm,
a third shaft mounted on said arm parallel to said first and second shafts,
a second pinion mounted on said third shaft and meshing with both said first and second gears,
means for establishing a reference angular position of said arm at which the axes of said first, second and third shafts lie in the same plane,
spring means for urging said arm rotationally away from said reference position, and
manually operable cam means for selectively either overcoming the urging of said spring means and rotating said arm to said reference position or allowing said spring means to rotate said arm away from said reference position.

References Cited by the Examiner

UNITED STATES PATENTS 2,607,238  8/52  English _____ 74—440
2,726,455  12/55 Saari _____ 33—179.52

FOREIGN PATENTS 648,703  1/51  Great Britain.

ISAAC LISANN, *Primary Examiner.*
LEONARD FORMAN, *Examiner.*